Jan. 1, 1929.
P. QUEISSER
1,697,021
ALTERNATING CURRENT ARC LAMP WITH INCLOSED ARC
Filed Jan. 27, 1927
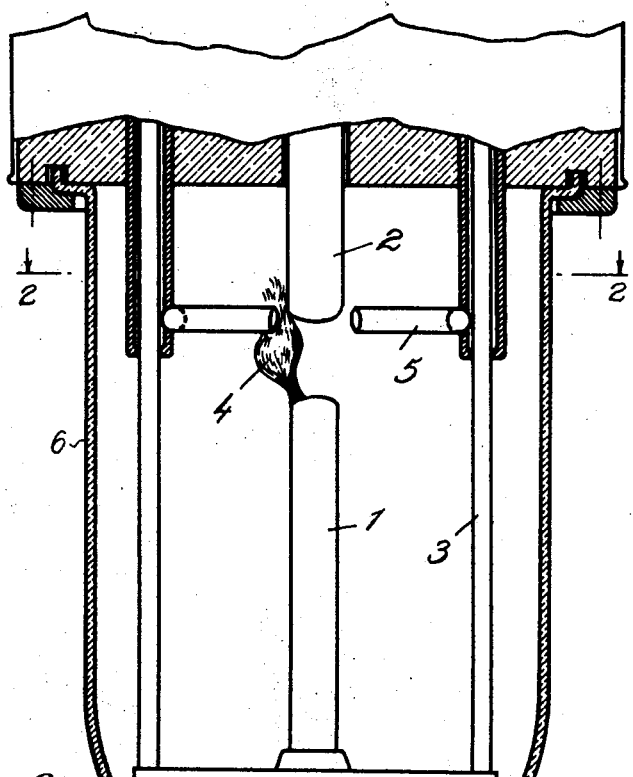
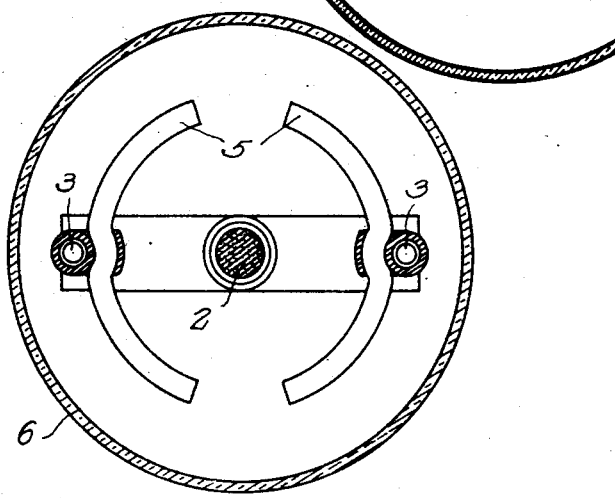

Patented Jan. 1, 1929.

1,697,021

UNITED STATES PATENT OFFICE.

PAUL QUEISSER, OF BERLIN-FRIEDENAU, GERMANY, ASSIGNOR TO GEBRÜDER-SIEMENS & CO., OF BERLIN-LICHTENBERG, GERMANY, A CORPORATION OF GERMANY.

ALTERNATING-CURRENT ARC LAMP WITH INCLOSED ARC.

Application filed January 27, 1927, Serial No. 164,102, and in Germany March 29, 1926.

My invention relates to an alternating current arc lamp with inclosed arc.

In alternating current arc lamps in which the arc is inclosed by an air-tight globe the arc is very sensitive to neighboring current-carrying conductors, such as the system of live rods and bars supporting the lower carbon, and may thus be deflected so as to crack the globe, and the tips of the solid or homogeneous flame arc carbons assume, furthermore, wedge shape in burning down.

The object of my invention is to eliminate these disadvantages inherent in this type of arc lamp. I attain this object by providing around the inclosed arc an annular body of iron, preferably a diametrically split iron ring with substantial gaps, which compensates the detrimental action of the current-carrying system of rods and bars upon the arc.

The effect which a split ring of magnetic material, when located as described and shown, has in such a lamp, resides in an absorption by the two ring halves of the magnetic field produced by the current flowing in the supporting rods laterally of the arc, so that the magnetic field cannot extend to the arc and blow it from its natural path.

In the drawings affixed hereto an embodiment of my invention is illustrated by way of example.

In these drawings:

Figure 1 represents the lower portion of an alternating current arc lamp in sectional elevation, embodying my improvement, and Figure 2 represents a transverse section through that portion of the lamp on line 2—2 in Figure 1.

Referring to the drawings, 1 and 2 are the homogeneous flame arc carbons inclosed in an air-tight globe 6. The lower carbon 1 is supported by the current-carrying system of rods and bars 3. Around the arc 4 is provided a body of iron 5 consisting of ring halves separated by gaps. This non-continuous ring is so arranged that the light of the lamps is obstructed as little as possible.

Various modifications and changes may be made without departing from the spirit and the scope of the invention, and I desire, therefore, that only such limitations shall be placed thereon as are imposed by the prior art.

I claim as my invention:

1. An alternating current arc lamp consisting substantially of two oppositely disposed carbons, a current-carrying system of rods disposed in the vicinity of the arc, and a ring of magnetic material open at two opposite places surrounding the inclosed arc.

2. An alternating current arc lamp consisting substantially of two oppositely disposed homogeneous flame arc carbons, a current-carrying system of rods disposed in the vicinity of the arc, and a ring of magnetic material open at two opposite places and surrounding the inclosed arc.

3. In an alternating current arc lamp, in combination, a lower carbon, a system of current-carrying rods adapted to support said lower carbon, an upper carbon, an air-tight globe adapted to inclose said carbons, and a non-continuous iron ring consisting of halves separated by gaps surrounding the place where the arc is formed.

In testimony whereof I affix my signature.

PAUL QUEISSER.